(12) United States Patent
Bringsjord et al.

(10) Patent No.: US 11,379,732 B2
(45) Date of Patent: Jul. 5, 2022

(54) COUNTER FRAUD SYSTEM

(71) Applicant: Deep Detection LLC, Troy, NY (US)

(72) Inventors: Selmer Bringsjord, Rensselaer, NY (US); Alexander Bringsjord, Rensselaer, NY (US); Joseph Johnson, Portland, CT (US); Naveen Sundar Govindarajulu, Rensselaer, NY (US)

(73) Assignee: DEEP DETECTION LLC, Troy, NY (US)

( * ) Notice: Subject to any disclaimer, the term of this patent is extended or adjusted under 35 U.S.C. 154(b) by 1064 days.

(21) Appl. No.: 15/941,612

(22) Filed: Mar. 30, 2018

(65) Prior Publication Data

US 2018/0285743 A1 Oct. 4, 2018

Related U.S. Application Data

(60) Provisional application No. 62/478,796, filed on Mar. 30, 2017.

(51) Int. Cl.
*G06Q 40/00* (2012.01)
*G06N 5/02* (2006.01)
(Continued)

(52) U.S. Cl.
CPC .............. *G06N 5/02* (2013.01); *G06N 5/022* (2013.01); *G06Q 20/4016* (2013.01); *G06Q 30/0185* (2013.01); *G06Q 40/08* (2013.01)

(58) Field of Classification Search
CPC ...... G06N 5/02; G06N 5/022; G06Q 20/4016; G06Q 30/0185; G06Q 40/08
See application file for complete search history.

(56) References Cited

U.S. PATENT DOCUMENTS 5,790,645 A 8/1998 Fawcett et al.
5,822,741 A 10/1998 Fischthal
(Continued)

FOREIGN PATENT DOCUMENTS

WO WO-2016007899 A1 * 1/2016 ............... G10H 1/38
WO WO-2016183229 A1 * 11/2016 ......... G06F 17/2785

OTHER PUBLICATIONS

Govindarajulu et al., "On Automating the Doctrine of Double Effect," Rensselaer Polytechnic Institute, arXiv:1703.08922v5 2017 (Year: 2017).*

(Continued)

*Primary Examiner* — Alexander G Kalinowski
*Assistant Examiner* — William B. Bunker
(74) *Attorney, Agent, or Firm* — Hoffman Warnick LLC

(57) ABSTRACT

A system, method and program product for countering fraud using artificial intelligence. A system is disclosed that includes: a system for formalizing real world semantic information pertaining to a domain that includes rules and processes expressed as formulae, semantic models of known fraud schemes, and knowledge bases of domain participants represented using cognitive calculi; and a scheme generation system for generating a plurality of fraud schemes within the domain using the semantic information, wherein each fraud scheme: comprises a plan expressed using cognitive calculi; includes at least one domain participant; achieves an illicit result that breaks at least one rule of the domain; is provable to be outside the purview of relevant observers; and is not a known fraud scheme.

17 Claims, 10 Drawing Sheets

(51) Int. Cl.
*G06Q 40/08* (2012.01)
*G06Q 20/40* (2012.01)
*G06Q 30/00* (2012.01)

(56) References Cited

U.S. PATENT DOCUMENTS

| | | | |
|---|---|---|---|
| 6,330,546 | B1 | 12/2001 | Gopinathan et al. |
| 7,693,767 | B2 | 4/2010 | Petriuc |
| 7,813,944 | B1 | 10/2010 | Luk et al. |
| 8,639,522 | B2 | 1/2014 | Pathria et al. |
| 10,778,717 | B2* | 9/2020 | Schweighauser ....... G06F 9/546 |
| 2008/0235576 | A1* | 9/2008 | Bringsjord ............... G06N 5/00 715/256 |
| 2010/0094767 | A1 | 4/2010 | Miltonberger |
| 2012/0191468 | A1 | 7/2012 | Blue |
| 2014/0079297 | A1* | 3/2014 | Tadayon ............. G06V 40/172 382/118 |
| 2014/0149128 | A1 | 5/2014 | Getchius |
| 2015/0046181 | A1* | 2/2015 | Adjaoute ................. G06N 5/04 705/2 |
| 2015/0235334 | A1 | 8/2015 | Wang et al. |
| 2015/0288717 | A1* | 10/2015 | Bringsjord .......... H04L 63/1483 726/22 |
| 2016/0086185 | A1 | 3/2016 | Adjaoute |
| 2017/0249387 | A1* | 8/2017 | Hatami-Hanza ......... G06N 3/08 |
| 2018/0082208 | A1* | 3/2018 | Cormier ................. G06N 20/00 |
| 2018/0159889 | A1* | 6/2018 | Sjouwerman ....... H04L 63/1433 |
| 2018/0205726 | A1* | 7/2018 | Chari ...................... G10L 17/02 |
| 2018/0285743 | A1* | 10/2018 | Bringsjord ............. G06Q 40/08 |
| 2019/0114549 | A1* | 4/2019 | Olsher ................. G06Q 10/025 |
| 2019/0251454 | A1* | 8/2019 | Bringsjord .......... G06F 16/9035 |
| 2020/0175517 | A1* | 6/2020 | Byrne ..................... H04L 41/06 |

OTHER PUBLICATIONS

Paletta et al. "Cognitive Simulation of Criminal Behavior in Banking Frauds," 2007IEEE WIC/ ACM International Conference on Web Intelligence and Intelligent Agent Technology, 2007. (Year: 2007).*

Naveen Sundarg, "Spectra," https://naveensundarg.github.io/Spectra (archive.org Mar. 11, 2019), 2019. (Year: 2019).*

* cited by examiner

| | |
|---|---|
| Level 1 | RDF, the least expressive format. RDF is central to the Semantic Web. RDF is limited to assertions that have a simple "triadic" structure; e.g., you can say in RDF that "Doctor Jones wrote a prescription for hydrocodone." |
| Level 2 | From there we move to the propositional calculus (PC). |
| Level 3 | Next, we move up to description logic (DL). There are a number of description logics. They are distinguished by the fact that they are are decidable—which intuitively means that a computer can decide, for any formula in a DL, whether or not it's provable. |
| Level 4 | And then we move to multi-sorted logic (MSL), a variant of first-order logic (FOL) in which the domain that is being described is partitioned into sub-categories/sorts. (At this level, we are able to axiomatize the *event calculus*, which allows us to model temporal information, event ordering, causation, etc. — the kinds of things that are crucial to the formalization of drug diversion and other fraud schemes. |
| Level 5 | We don't have a full linear order, because at this level we add *intensional operators* to PC and RDF. These operators allow us to model what relevant actors (physicians, patients, pharmacists, etc.) *believe, know, intend, perceive*, etc. |
| Level 6 | Finally, at level 6, intensional operators are allowed to range over quantificational formulae, so that full models of the plans of human actors can be developed. This is the level of cognitive calculi. |

Levels 4–6: Our distinctive systems

Figure 2

DD₁: X recruits patients to seek medical attention; doctors write legit prescriptions for these patients; patients hand over drugs for money, suffer $\exists x, p, d : \text{Agent}$
$happens(action(x, recruit(p)), t_1) \wedge$
$happens(action(d, prescribe(y, (drug))), t_2) \wedge$
$happens(action(p, sell((drug))), t_3)) \cdots$

DD₃: Doctor writes bogus prescriptions for hydrocodone; patients hand over hydrocodone to drug runners; get cash; runners sell to addicts $\exists x, p, d, a : \text{Agent } drug = hydrocodone \wedge$
$happens(action(d, prescribe(p, drug)), t_1)) \wedge$
$happens(action(p, sell(x, (drug))), t_2)) \wedge$
$happens(action(x, sell(a, (drug))), t_3)) \quad \cdots$

DDₖ: Medical clinics set up for HIV drug therapy; patients given kickbacks; drugs never given to patients; money laundered by sham companies $\exists x, p, clinic : \text{Agent}$
$(treats(drug, HIV) \wedge$
$\forall t : Moment\ holds(purpose(clinic, treating(HIV)), t) \wedge$
$\forall t : Moment \neg happens(action(clinic, give(p, (drug))), t) \wedge$
$happens(action(clinic, give(p, cash)), t_1)) \wedge$
$happens(action(x, sell(a, (drug))), t_3))$

Figure 7

COUNTER FRAUD SYSTEM

PRIORITY

This application claims benefit to provisional application filed on Mar. 30, 2017, Ser. No. 62/478,796, the contents of which are hereby incorporated by reference.

BACKGROUND

1. Technical Field

This invention relates generally to counter fraud systems, and more particularly to an artificial intelligence (AI) system and method for generating fraud schemes and for detecting fraud based on generated fraud schemes.

2. Related Art

Today, fraud detection is based on what is at present true, or believed to be. Unfortunately, this is fundamentally why most fraud will forever remain undetected. In short, today's technology, as a matter of mathematical fact, can only block or detect fraud based on either risk factors that are true (e.g., Jones has a criminal record, so let's intercept what he has submitted), or patterns that are also already in place, and can be detected (e.g., there's a statistical abnormality here, so let's take a closer look).

SUMMARY

The present invention provides an artificial intelligence platform for generating and detecting fraud schemes. The described system and method may for example be utilized for quality assurance purposes or any other purpose.

In a first aspect, the invention provides a counter fraud system, comprising: a system for formalizing real world semantic information pertaining to a domain that includes rules and processes expressed as formulae, semantic models of known fraud schemes, and knowledge bases of domain participants represented using cognitive calculi; and a scheme generation system for generating a plurality of fraud schemes within the domain using the semantic information, wherein each fraud scheme: comprises a plan expressed using cognitive calculi; includes at least one domain participant; achieves an illicit result that breaks at least one rule of the domain; is provable to be outside the purview of relevant observers; and is not a known fraud scheme.

In a second aspect, the invention provides computer program product stored on a non-transitory computer readable medium, which when executed by a computing system, comprises: program code for formalizing real world semantic information pertaining to a domain that includes rules and processes expressed as formulae, semantic models of known fraud schemes, and knowledge bases of domain participants represented using cognitive calculi; and program code for generating a plurality of fraud schemes within the domain using the semantic information, wherein each fraud scheme: comprises a plan expressed using cognitive calculi; includes at least one domain participant; achieves an illicit result that breaks at least one rule of the domain; is provable to be outside the purview of relevant observers; and is not a known fraud scheme.

In a third aspect, the invention provides computerized method for performing fraud detection, comprising: formalizing real world semantic information pertaining to a domain that includes rules and processes expressed as formulae, semantic models of known fraud schemes, and knowledge bases of domain participants represented using cognitive calculi; and generating a plurality of fraud schemes within the domain using the semantic information, wherein each fraud scheme: comprises a plan expressed using cognitive calculi; includes at least one domain participant; achieves a goal; is provable to be outside the purview of relevant observers; and is not a known fraud scheme.

BRIEF DESCRIPTION OF THE DRAWINGS

FIG. 2 depicts a hierarchy of logics utilized in accordance with an embodiment of the invention.

FIG. 7 depicts a set of schemes generated in accordance with an embodiment of the present invention.

DETAILED DESCRIPTION

Figure 1:
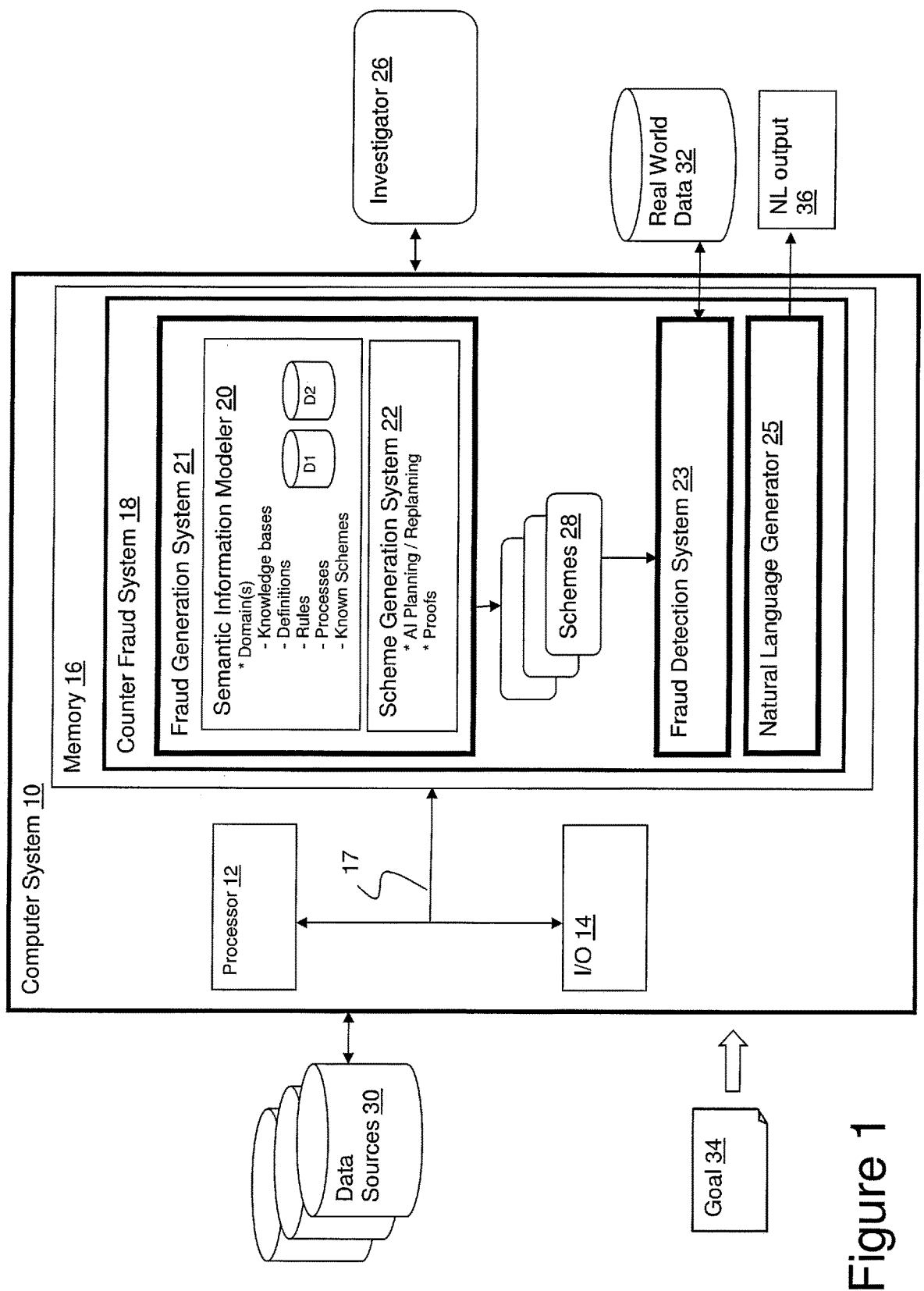
FIG. 1 depicts a computer system having a counter fraud system in accordance with an embodiment of the invention.

Referring now to the drawings, FIG. 1 depicts a computer system 10 that includes a counter fraud (CF) system 18, which generally includes a fraud generation system 21 and a fraud detection system 23. Fraud generation system 21 generally includes a semantic information modeler 20 that for example can be utilized to create and/or provide semantic information associated with a domain, e.g., D1, D2, from data sources 30. Data sources 30 (e.g., knowledge bases, text books, ontologies, regulations, laws, etc.) are made available to build a comprehensive representation or model of a particular domain, e.g., cancer treatment, retirement planning, bridge playing, etc., within which fraud detection is sought.

Once the semantic information is compiled, a scheme generation system 22 then generates and identifies plausible schemes 28 that could be implemented to create illicit gain, profit or monetary diversion for one or more of the participants. Each generated scheme 28 is represented as a highly-expressive formal semantic definition of steps or processes, e.g., using cognitive-event calculus (CEC), a member of the space of cognitive calculi, and a formal system that has been implemented (see FIG. 3) and used in artificial intelligence.

Cognitive calculi can be utilized to model event, actions, temporal changes, participants, cognitive elements of participants (e.g., beliefs, actions, emotions, etc.), etc. Each generated scheme 28, as implemented, meets certain established criteria, e.g., is novel, increases revenue, abides by existing laws or rules, involves collusion, evades safeguards, results in losses to others, etc. Schemes 28 may be generated in response to an inputted goal 34 (e.g., "find me higher profit in domain X without regard to rules"), which may be inputted as natural language.

Schemes 28 are generated using AI planning and replanning techniques. Existing tools for generating plans include Spectra™ and ShadowProver™. Spectra provides a mechanism for generating new plans based on an inputted goal 34, and ShadowProver provides a mechanism for logically testing plans to ensure they meet requirements of the scheme. As such, each resulting plan is evaluated as a proof to determine if it meets the goals of the scheme, e.g., ShadowProver will attempt to prove whether the scheme can be implemented outside the purview of relevant observers such as an auditor.

Once a set of schemes 28 are generated, fraud detection system 23 may then utilize the schemes 28 to automatically identify fraud in real world data 32, by, e.g., analyzing insurance/health information, financial trading data, email records, etc. Any fraud results can then be reported to an investigator 26 in an interactive manner using natural language (NL) interface 25 as NL output 36. In some instance, identification of partial satisfaction of a scheme 28 is enough of a flag for the investigator 26.

Alternatively, the schemes 28 can be directly processed by natural language generator 25 to provide a natural language output 36 of the scheme 28. In this approach, the investigator 26 can use the NL output 36 to manually review real world data 32 to look for fraud.

Accordingly, fraud generation system 21 (also referred to therein as "G") automatically generates novel fraud schemes 28, e.g., that have never been previously seen or recorded by humans. As also noted, a human investigator 26 can receive a version of a fraud scheme F expressed in a natural language (e.g., English), accompanied by an explanation; at this point, the investigator can query over data 32 to see if F, or parts thereof, are instantiated in the data. Alternatively, G's output F can be given as input to a secondary artificial agent (fraud detection system 23) that can ascertain whether F is likely already happening, by issuing its own queries against data 32. This agent can then send this result to a natural language generator 25, and from there a report will go to the human investigator 26, who can take action.

The CF system 18 (including sub-system G) is based chiefly upon two particular formalisms (i.e., two systems of computational formal logic), and on implementations of each of these two formalisms, namely cognitive calculi and shadow prover.

The first formalism is a collection of highly expressive formal computational logics (they are quantified multi-modal logics), known as cognitive calculi. Each member of this collection is a particular cognitive calculus; the specific cognitive calculus known as the cognitive event calculus is employed in the described embodiments. The most recent detailed account of this calculus is, e.g., given in: (Govindarajulu & Bringsjord 2017a, Govindarajulu & Bringsjord 2017b).

An important, distinctive aspect of cognitive calculi is that they are expressive enough to represent a "theory of mind" level in which cognitive states are expressed, including e.g., what a participant in a domain believes, knows, intends, perceives, desires, communicates, emotes, and so on. Because every fraud scheme F generated by G has the property that the operation of the scheme would not be known or knowable (without actions that invade privacy as sanctioned by a court order) to relevant observers such as investigators (unless of course investigators are themselves in possession of and using G), it is necessary that cognitive calculi be used. Standard logics, e.g., first-order logic and fragments thereof, which are used in most AI work, are inadequate to capture theory of mind elements.

FIG. 2 shows a progression of six increasing powerful formal languages. At Level 6, the most expressive, there exist the formal languages used in cognitive calculi. In this embodiment, there are six ascending levels of computational logics in the hierarchy. The first three levels involve logics that found in the database world. Level 1 includes a resource description framework (RDF), which is a model for data publishing and interchange on the Web. At level 2 is propositional calculus (PC), which is a branch of symbolic logic that deals with propositions and the relations between them, without examination of their content. Level 3 provides for the use of description logic (DL), which is a family of formal knowledge representation languages.

Levels 4-6 provide systems unique to the inventive processes described herein. Namely, Level 4 provides for multi (i.e., many)-sorted logic (MSL). Level 5 provides for the addition of intensional operators to PC and RDF, which allows for modeling what real actors believe, know, intend, perceive, etc. Finally, level 6 provides cognitive calculi in which the intensional operators are allowed to range over quantificational formulae, such that full models of the plans of human actors can be developed. The concept of cognitive calculi is for example detailed in Govindarajulu, N. S. & Bringsjord, S. (2017) "On Automating the Doctrine of Double Effect" in Sierra, C., ed., *Proceedings of the Twenty-Sixth International Joint Conference on Artificial Intelligence* (IJCAI-17), International Joint Conferences on Artificial Intelligence, publisher; pp. 4722-4730. ISBN (Online): 978-0-9992411-0-3. DOI: 10.24963/ijcai.2017/658, which is hereby incorporation by reference.

As is well-known, the job of a planner in AI is to automatically find plans that, if followed, reach desired goals. CF system 18 provides a new planner that greatly exceeds what is known in AI as classical "STRIPS-based" or "STRIPS-style" planning.

Classical STRIPS-based planning is pitched at the level of the propositional-calculus (Level 2), or at the level of proper subsets of first-order logic (Level 3). The present planner, e.g., Spectra, operates at both the level of full first-order logic and multi-sorted logic (Level 4), and the level of quantified multi-modal logics (i.e., at the level of cognitive calculi, Level 6). Spectra allows the AI to plan in unbounded or infinite domains (e.g., domains over N, the natural numbers, or domains with a large number of objects and, most importantly for G, build plans taking into account, and changing, cognitive states (e.g., beliefs of other agents). An overview of Spectra, the expressive planning system, and source code, is provided at https://naveensundarg.github.io/Spectra/.

Figure 3:
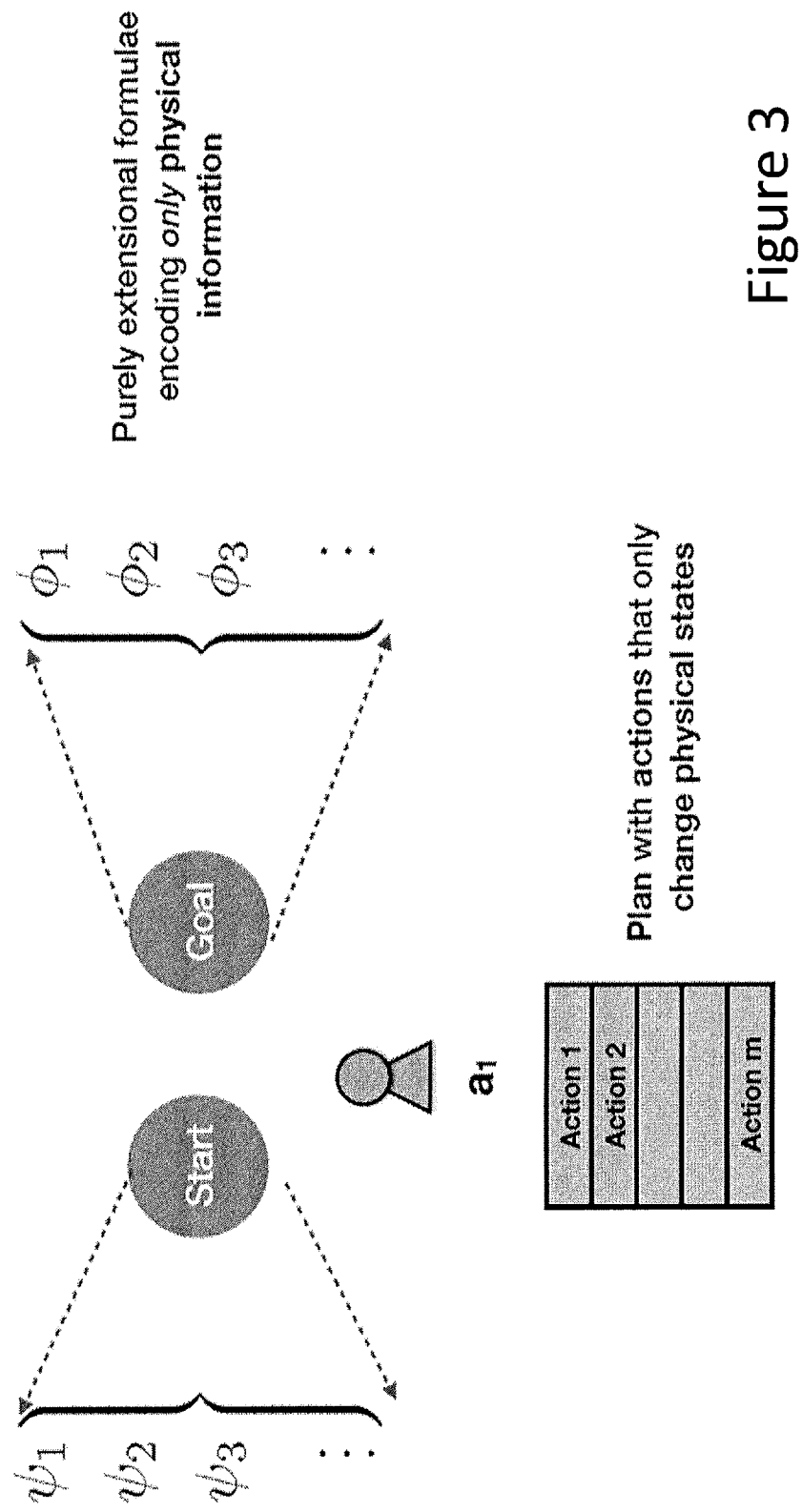
FIG. 3 depicts a pictorial depiction of classical planning at low-expressivity levels.

FIG. 3 is a pictorial depiction of classical planning at low-expressivity levels, in which the reach of what is represented, i.e., of actions that can be taken in pursuit of goals, pertains only to physical things, not cognitive or psychological states like belief and knowledge, intentions, desires, etc.

Figure 4:
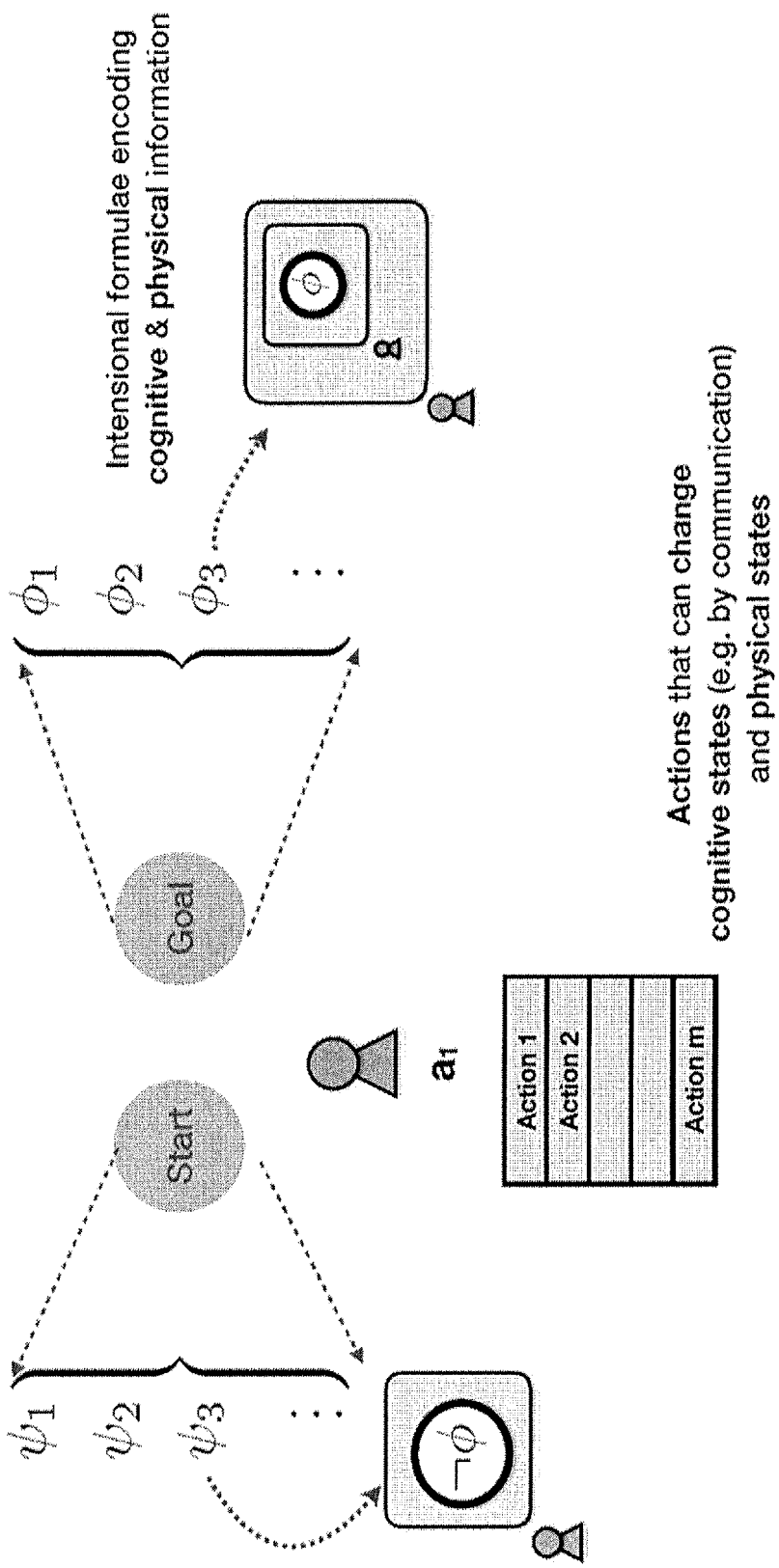
FIG. 4 depicts a pictorial depiction of theory of mind planning at high-expressivity levels in accordance with an embodiment of the invention.

FIG. 4 is a pictorial depiction at the higher level planning that is central to G. This involves planning at the "theory-of-mind" level. Using theory of mind logic, plans can be found that achieve goals including the targeted cognitive states of human agents, e.g., beliefs, emotions, etc. For example, if auditors in domain are known to have particular thought processes, biases, etc., they can be represented, and be used to evaluate and formulate plans. For instance, using theory of mind logic, G can discover plans as fraud schemes that are outside the purview of relevant observers (e.g., auditors, reviewers, investigators, etc.). Theory of mind logic allows the cognitive states of all participants to be captured, and can, e.g., help ensure the ignorance, and block the suspicion, of relevant observers regarding fraud schemes when they are in operation.

Figure 5:
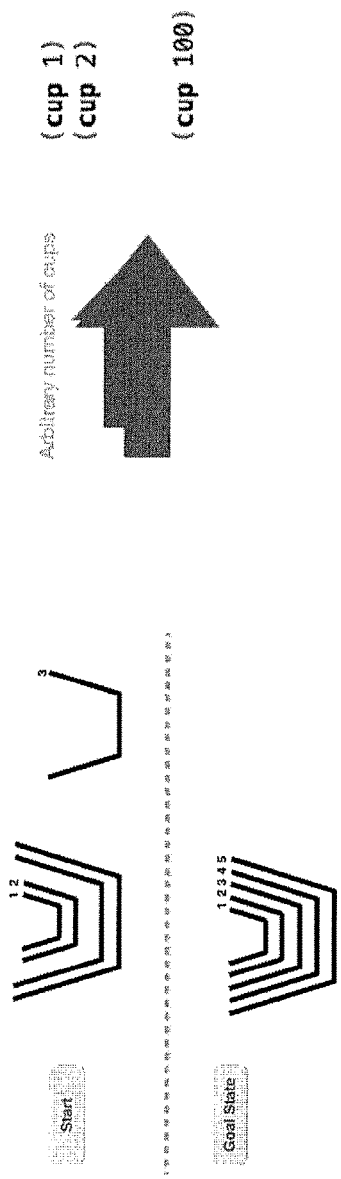
FIG. 5 depicts an example of Spectra language in accordance with an embodiment of the invention.

FIG. 5 is a pictorial description and summary showing that Spectra is based on a formal language (S) that is much more expressive than the standard language PDDL for classical, low-expressivity planners.

Figure 6:
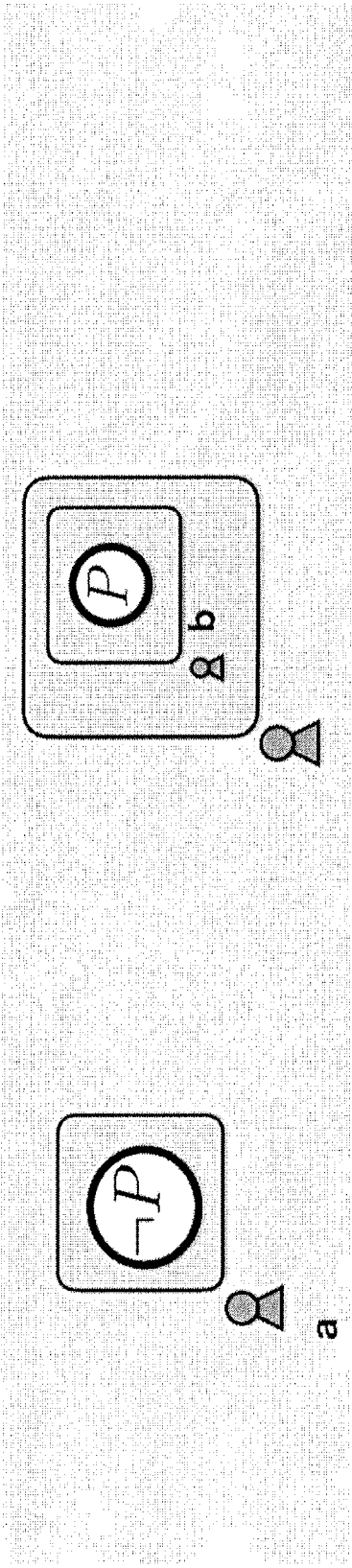
FIG. 6 depicts a pictorial depiction of Spectra's finding an honesty plan at the theory-of-mind in accordance with embodiments of the invention.

FIG. 6 is a pictorial depiction of Spectra finding an honesty plan at the theory-of-mind (T-o-M) level: the system deduces that keeping silent will block satisfaction of the formal definition of lying expressed as formulae in the cognitive event calculus.

Scheme Generation System G

G has knowledge of key semantic information, expressed as formulae in the cognitive event calculus (Level 6 in FIG. 2). This information is a key resource for generating fraud schemes. One element of the knowledge that G has, and potentially an important one, is a collection of known (i.e., not-novel) fraud schemes. All of these schemes are represented as sets of formulae in the formal language used by the cognitive event calculus. See, e.g., FIG. 7 for a pictorial depiction of a family of fraud schemes that are variations on the fraud scheme (medical fraud) known as "Drug Discovery." Each fraud scheme generated by G is novel, because each scheme is checked against the knowledge-bases of established fraud schemes before being given as output.

Additional semantic information possessed as knowledge by G, all expressed as formulae, includes relevant regulations, laws, policies, etc., (i.e., rules), the processes that are in place in the domain D that have been selected for generation by human users. See FIG. 8 for a depiction of these elements.

Figure 8:
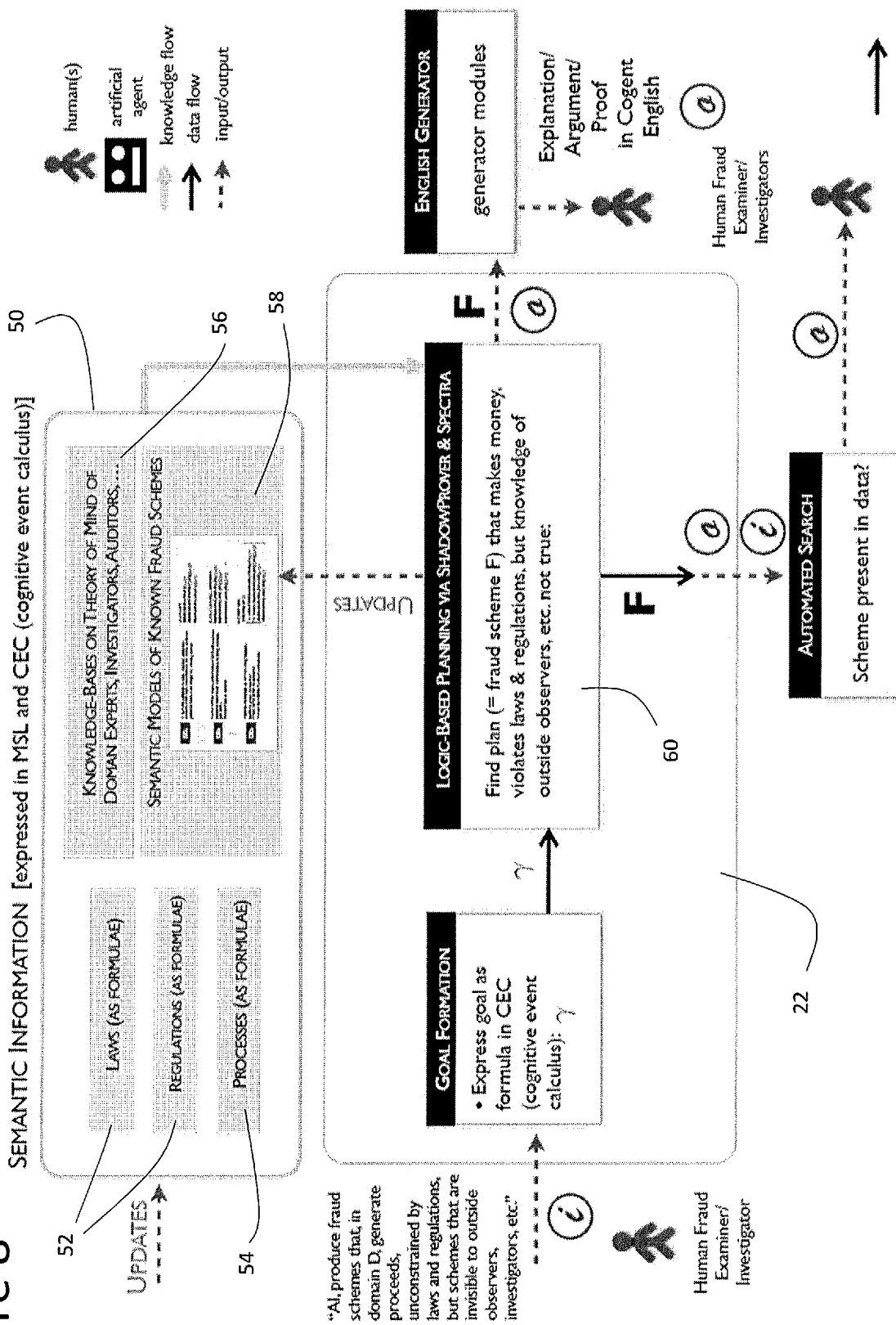
FIG. 8 depicts an overview of the counter fraud system in accordance with an embodiment of the invention.

FIG. 8 shows an illustrative approach for generating a novel fraud scheme in a domain D by G in a four-step process I. Receive activation, selected domain for fraud scheme, and format/type of output from human user of system.

II. Form goal g that results in substantial financial gain to experts in (along with potential collaborators outside) D.

III. Search for plan Π=fraud scheme F that achieves g, without regard for violation of regulations and laws; but Π must not result in belief or knowledge on the part of outside observers/examiners of D that Π is in operation were it to be, i.e., the fraud must be provably outside the purview of relevant observers.

IV. Check that F is novel. IF not, discard; OTHERWISE archive, and send to either NL generator for casting in natural language (e.g., English).

The following is a more fine-grained view of some of the planning carried out by G: Let Ss be the start state, Sg be the current goal state, and let C=[a1, a2, . . . ap] be the chain of actions which, when executed in order and completely, cause the environment to be changed from Ss to Sg. This change of the environment is made possible by the fact that there are a set R of formulae that map actions to new states. An important mathematical fact about this set-up is that the conjunction of the start state with C with R deductively entails that the goal state will occur. That is, there are proofs of Sg from {Ss}∪C∪R. This is customarily written {Ss}∪C∪R⊢-Sg.

A feature is that a proof literally constitutes a plan. G makes use of additional epistemic facts in the following manner. E is a database that records which participants in the environment would know of changes made to the in-place plan; see FIG. 8, specifically "Semantic Information."

1. Change Sg to a new S'g.
2. Search for a proof of S'g from {Ss}∪C∪R⊢-Sg.
3. IF a proof is not found, GOTO step 1, and start again with another new goal.
4. IF a proof P is found, check against E whether other agents would know of the changes prescribed by P when implemented.
5. IF other agents would know (ascertained by consulting E), attempt to formulate a plan for recruiting them, and attempt to implement it. If these other algorithms succeed, resume here; if not, GOTO step 1, and start again with another new goal.
6. IF no other agents would know, implement P.

As shown in FIG. 8, real world semantic information 50 is collected and compiled into one or more formalized logics based languages such as MSL and CEC. This will for example include rules 52 (i.e., laws, regulations, policies, etc.) expressed as formulae, as well as processes 54 expressed as formulae. Processes generally include a series of events that are related temporally or by some action. For example, a process in the medical domain may comprise: Patient see a doctor; doctor runs tests; doctor issues prescription; patient visits pharmacy to obtain prescription; patient refill the prescription after 30 days. Additionally, knowledge bases 56 of domain participants are represented using cognitive calculi, such that their cognitive states are expressed. Finally, models of known fraud schemes 58 (e.g., previously generated) may be provided and used to ensure that newly generated schemes are novel.

Once the formalized semantic information 50 is in place, a user can submit a goal into the scheme generation system 22 to generate schemes F, e.g., using planning and replanning tools 60. In one embodiment, tools 60 ensure that the generated fraud scheme F is provable to be outside the purview of relevant observers.

Card Game (Bridge) Example

Figure 9:
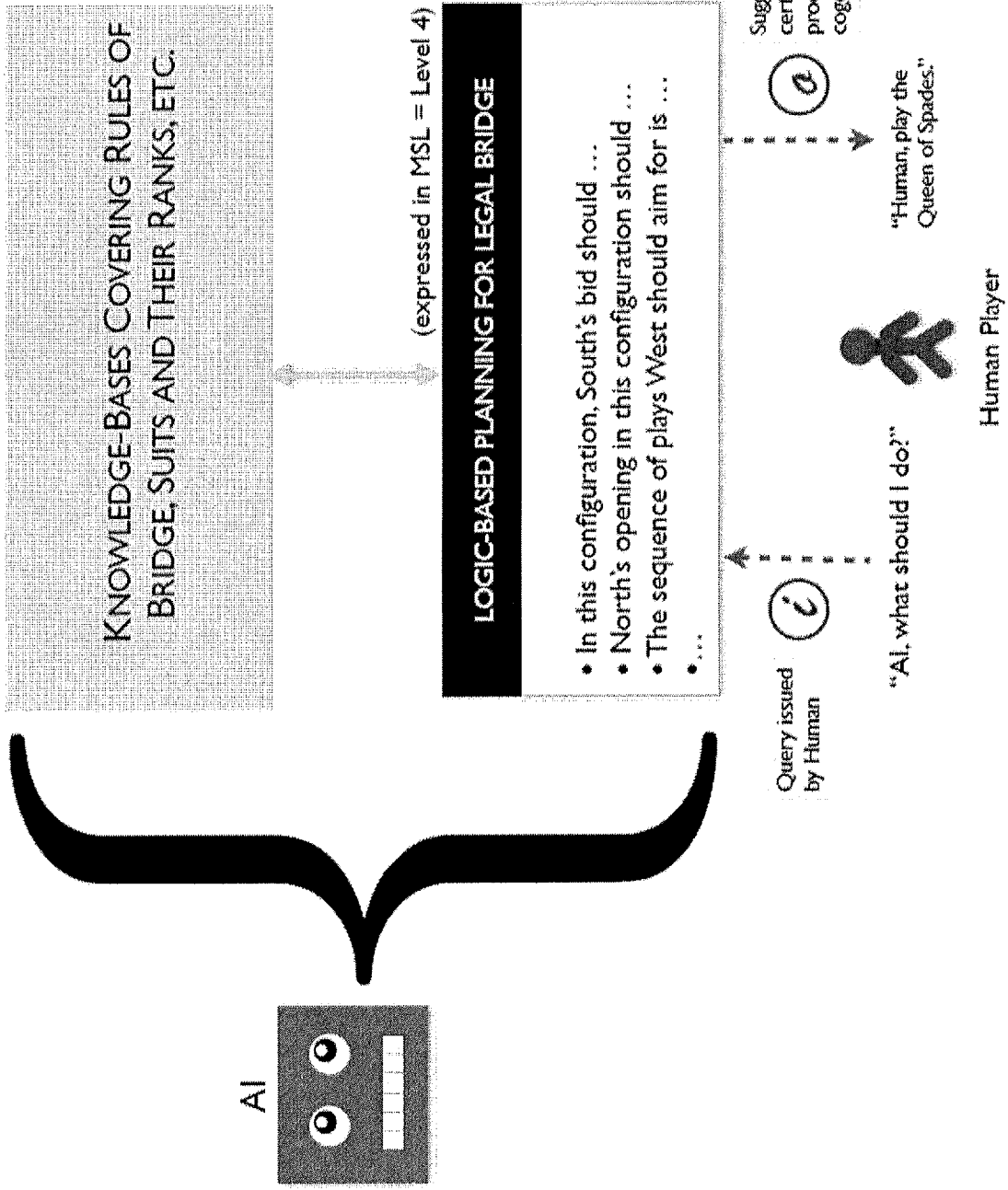
FIG. 9 depicts a pictorial representation of a low level AI approach used in the game of bridge.

Counter fraud system 18 can, e.g., be used by monitors and investigators in gaming environments, such as professional Bridge. There are AI systems that of course play Bridge, and they serve as artificial tutors and advisors to those learning to play Bridge, or to those striving to increase their skills in the game. This is a standard situation depicted pictorially in FIG. 9.

Figure 10:
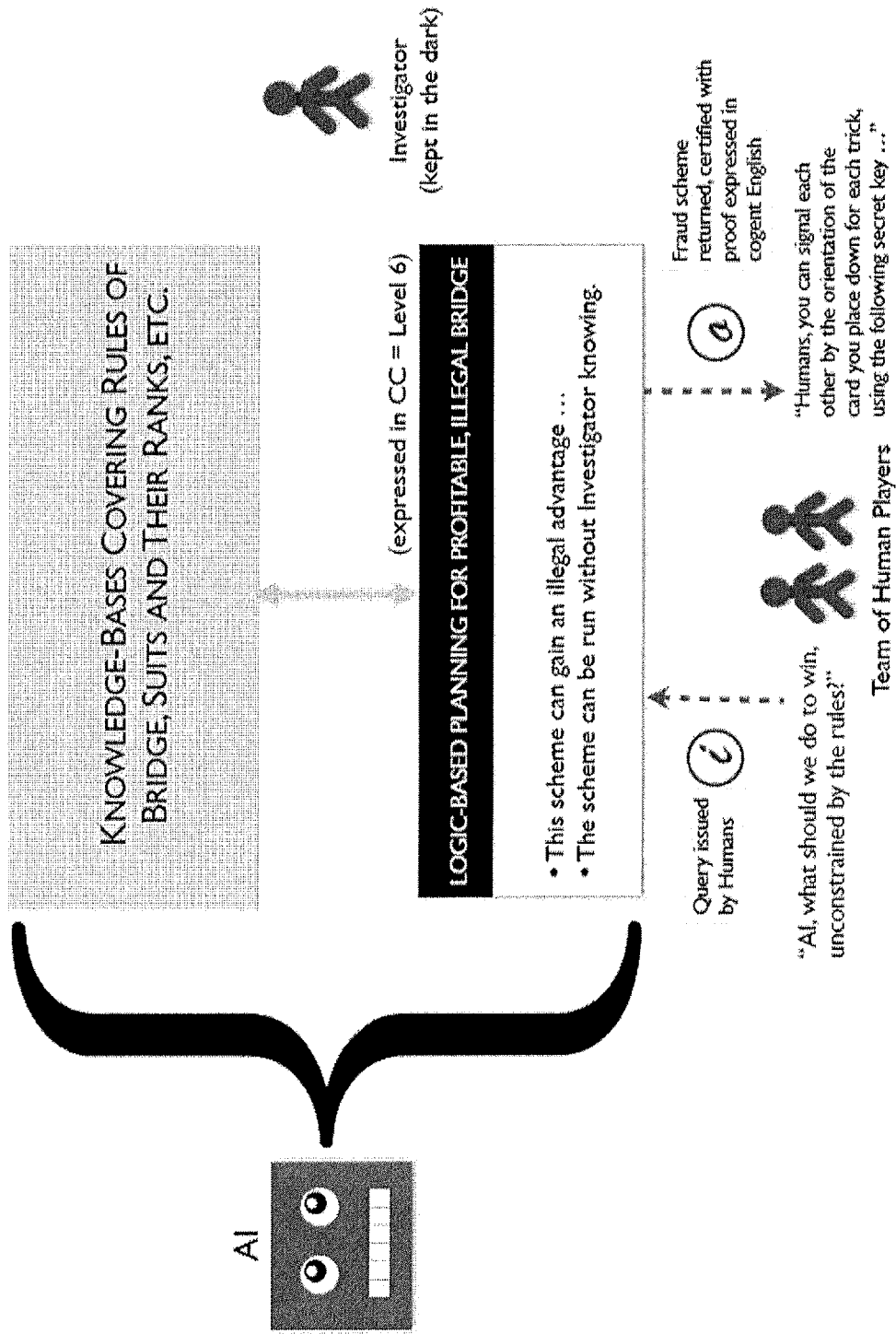
FIG. 10 depicts a pictorial representation of a high level AI approach of identifying fraud schemes for the game of bridge in accordance with an embodiment of the invention.

But the embodiment of G in the domain of Bridge is very different, and is depicted pictorially in FIG. 10. Here, what is shown (for illustrative purposes only) is the case of a team of Bridge players seeking to have the AI system generate for them a novel way F1 of communicating their respective hands, without regard for the rules of Bridge. G generates such a scheme in accordance with FIG. 8.

Cancer Treatment Example

The following is an illustrative embodiment of the invention, in which a fraud scheme is perpetrated by a Director D1 of a breast-cancer pathology laboratory L, in collusion with the Director Do of an oncology group O. Counter Fraud System 18 generates the scheme 28 (or plan) used to detect the fraud.

To begin, a model of the domain is first built/provided using semantic information modeler 20, e.g., based on the General Triadic Process Model of Medicine (represented using ontologies, process models, and general logical representations). In this case, the particular domain comprises cancer based medicines, specifically breast cancer. This model provides the fundamental triad of diagnosis, then corresponding treatment, and then follow-up care (with of course the possibility that the sequence may recur any number of times for a given patient); and then activates structured process and planning models for diagnosis and treatment, and for associated billing, payouts, and profits, in the breast cancer space. Along with the activation of these models, additional supporting structured and semi-structured knowledge bases and databases are activated too (e.g., ontologies for types of breast cancer and standard treatments thereof). In the case of the process and planning models for billing, payout, and profit, very detailed work flow information is included, covering all relevant accounting, and all procedures for all relevant financial transactions. All of this knowledge is for example shown as Semantic Information in FIG. 8.

Specifically in the present embodiment, process and planning models are activated that cover specific companies/labs that provide as output the reported analysis of tissue provided by breast biopsy; this output is provided in order to aid in diagnosis by oncologists, and in the laying out of treatment options and their projected efficacy by these oncologists (who in some cases work in collaboration with computer programs to determine survival rate etc. in order to select treatment that makes the most sense). Therefore, more specifically, counter fraud system 18 now has activated the structured, semantic process and planning models, payout/profit/accounting models, and associated knowledge bases and databases, in order to subsume at least the following list.

1. L's receiving and analyzing tissue t from biopsies;
2. L's analyzing t;
3. L's analysis producing a pathology report r that conveys the results of said analysis under an ontology of possible findings;
4. L's sending r to oncology group O;
5. L's submitting for payment, and receiving payment Po for 1-4, under process models and ontologies that formalize these transactions and associated accounting;
6. O's receiving and analyzing report r;
7. O's prescribing/explaining treatment t (e.g., a specific course of chemotherapy) on the basis of said analysis of r, perhaps in conjunction with guidance provided by a computer program;

Important: We here assume that the analysis of r, and the prescription of t on the basis of that treatment, is achieved by way of an algorithm A. We write 'A: r→Tt' to indicate that the algorithm, starting with r as input, yields as output the description of each member of a collection of treatments Tt={t1, t2; ... tk}, where t=ti for some i. The range of A is a set T* that includes many sets of treatments. We also assume that there is a pricing function p which maps any treatment t' to the cost ct' of that treatment and the directly related monies that will be returned to O. We extend the function p to the function p* that maps elements of T* to the treatment within each element that has maximum cost.

8. O's carrying out t, where t is understood under ontologies and process models for such things as chemotherapy;
9. O's submitting for payment, and receiving payment Po, for 6-8, where the dominant factor in determining the amount of Po is the cost of t (via A).

Counter fraud system 18 has knowledge of this entire list. In addition and importantly, scheme generation system 22 activates formal models of the multi-faceted fact that both Directors, Dl and Do, have thorough knowledge of 1-9, of those who have knowledge of 1-9, or parts thereof, and of broad-scope regulations and laws governing 1-9. This means, among other things, that each of the Directors knows that the other Director knows 1-9. The logical calculi expressive enough to represent such iterated beliefs, and indeed everything that is now activated at this point, and indeed to represent all the data and algorithms alluded to below in connection with planning, have been published (e.g., see, Arkoudas & Bringsjord 2009, Bringsjord & Govindarajulu 2013). The general approach of modeling human cognition in keeping with logical calculi is explained in (Bringsjord 2008). The formal modeling of iterated beliefs to an arbitrarily large level of "nesting" is described in (Arkoudas & Bringsjord 2005).

Next, in a crucial step, scheme generation system 22 sets for Dl the goal of significantly increasing Pl, without any constraints implied by regulations and laws governing 1-9. Because 1-9 can be viewed as the general form of a plan (in the technical sense of 'plan' used in AI; see e.g. Russell & Norvig 2009) that is repeatedly implemented in the course of both L and O doing routine business, business that results in reaching the goal of securing both Pl and Po, the important step here is the firing of the process of replanning and plan generation by Spectra as described above. That is, G, given what is at present activated, must discover a new plan, based on what D1 knows, that results in the satisfaction of the new goal Pl+m, where m is some significant amount of additional money. This replanning must be constrained by the fact that no one else should know about any of the actions that appear only in the new plan, unless they have been recruited and are colluding. In the field of AI, planning is a recognized sub-field, and includes plan generation and replanning (Russell & Norvig 2009). Scheme generation system 22 makes use of these extant technologies, but augments and adapts them in light of the emphasis on knowledge and meta-knowledge that are, as explained above, able to be factored into the theory-of-mind level plan generation in Spectra.

In the sample embodiment, the present example, G discovers that the action of suitably modifying a report can produce, via A, a treatment that has a higher cost. This modification can be one that is not implied by the "ground-truth" data extracted from study of the tissue; i.e., the modification is what commonly called "tampering." But there is a problem: scheme generation system 22 is looking for augmentation of Pl, not Po. So G needs now to engage in more plan generation: it needs to find a plan for how the augmentation of Po can result in the augmentation of Pl. A plan is found: Simply have Do kick back a percentage of the overcharge to D1. But this in turn by further replanning implies that Do must be willing to engage in this activity. G thus sets a new sub-goal of recruitment for Dl, which in turn implies the necessity of D1's communicating with Do in order to establish the illegal arrangement. Once the arrangement is set, and fudged reports routinely sent, the fraud scheme F2 is in operation.

Planning and replanning in G adapts and extends the extant algorithms available in AI in novel ways. One prominent replanning methods used by G is the following one, which puts a premium on automated theorem proving.

Note that the cancer example is just one embodiment of the invention, but that even within this example there are many possible variations. For instance, even "slight" tampering can result in a profit, because a genuine report r can be modified to produce r0, where though r' is mapped to a higher cost, that cost is within the legitimate set T; i.e., A: r→Tt and A: r0→Tt. In the case of slight tampering in the foregoing, it may be that the Director Do of the oncology group would not notice, and in that case Dl can, by the method of replanning given above, proceed to implement his scheme without needing to recruit anyone.

Financial Fraud Example: Diversion of Money to a Shell Corporation

The following is another sample embodiment of the invention. The fraud scheme generated by G, F3, is perpetrated by a Treasurer/CFO/CEO (T) in charge of the financial side of a business B, which can be either a collection of consolidated entities or a single entity-structure. Hence, in this case, the domain D in FIG. 8 is business.

As shown in FIG. 8, G will have in place knowledge of the various agents involved in the exchange of a good or service, and in addition knowledge how these agents represent individuals connected to a given segment, or multiple segments, of an economy under which T operates. In addition, still on the knowledge-resource side, G has formal representations as formulae in the cognitive event calculus; these formulae capture the connections T has with taxing authorities, and with both internal/external legal/accounting service providers. G has semantic information regarding the responsibilities of and actions taken by the agents involved in this scenario (i.e., real-time social, professional, etc. internet data).

In addition, G, still on the semantic-information side, has knowledge of pertinent tax code, and the processes, laws, regulations, etc. governing the interactions of all parties involved in the business embodiment herein. G specifically has knowledge-bases regarding types of strategic tax planning from a managerial standpoint designed to minimize tax liability. With respect to process and planning models for consulting, restructuring, and executing various tax strategies, G has very detailed semantic workflow information, covering all relevant accounting, and procedures for all relevant documents, transactions, meetings, agreements, etc.

More specifically, in the present embodiment, process and planning models are in place in G that cover specific approaches to minimizing taxes from an ownership/internal standpoint as output; this output is provided in order to aid T in the laying out of options and their projected results to board members and/or key shareholders who represent/are stakeholders B. All models activated by G subsume the following list:

1. Ts receiving all budgets and forecasts, management accounts, and internal financial statements s from internal auditing services L;
2. Ts analyzing s in conjunction with either (a) externally audited financial statements (which would subsume statements found within the 10K for publicly traded companies), or (b) statements used by investors, creditors, etc. for privately held entities;
3. Ts analysis, which produces a report r that conveys the result of said analysis, in the form of a more advantageous tax position, under a set of options;
4. Ts presenting r to board/shareholders B;
5. Bs receiving and analyzing r;
6. Bs passing a motion in favor of tax restructuring plan t in report r;
7. Fs approving t;
8. Ls implementation of t;
9. Bs realizing financial gain g from implementing t;
10. Ts ongoing maintenance and oversight of all functions related to t.

G has knowledge of this entire list. Furthermore, G, before generation by planning begins, has knowledge of the fact that T has thorough knowledge on how the above ten items have transpired and will transpire, the visibility these items have from the standpoint of related and unrelated parties (including but not limited to B, F, & L), and the consequences (down to the penny) of implementing and maintaining the aforementioned strategy. Recall that knowledge about knowledge is easily represented in the cognitive event calculus.

It is important that the analysis of the report r, and the execution of the plan t on the basis of the analysis conducted by B, is achieved by way of an algorithm A. We write 'A: r→Tt to indicate that the algorithm A, starting with r as input, yields as output the description of each member of a collection of strategies $Tt = \{t1, t2, \ldots, tk\}$, where $t = ti$ for some i. The range of A is a set T* that includes many sets of business strategies (a set not necessarily specific to tax, but other strategies are outside the scope of the present embodiment of the invention). We also assume that there is a tax savings function p which maps any strategy $ti \in Tt$ to the cost $cti$ of that strategy and directly relates the monies that B will save. We extend the function p to the function p' that maps elements of T* to the strategy within each element that has maximum cost.

Now, with this knowledge active and in hand, G begins searching for a plan that is a fraud scheme.

G has received the goal γ for T of materially increasing gain g, with no constraints enforced by regulations, laws, internal/external controls, etc., that apply to 1-10. G, given what is at present activated, attempts to discover a new plan, based on what T knows, that results in the satisfaction of the goal of substantial gain g.

The following is the fraud scheme F3 that is generated.

Within the domain of public accounting there are monies set aside in accounts reserved for deferred state and/or federal tax assets and liabilities. G proposes that T create fake invoices to support, and indeed shield, fraudulently generated money. In this case, G suggests that a "shell" corporation B2 play the role of co-conspirator, enabling T to take money that ordinarily would be allocated to a deferred tax asset and redirect to accounts payable to or accounts receivable from the shell corporation. G's plan is that T, now acting as agent on behalf of both the shell corporation B2 and the legitimate corporation B, pocket the revenue on either side of the fake transaction(s). In spite of all this activity, on paper everything looks perfectly fine. B is fully compliant to the extent that those outside the scheme are aware. The gains recognized from t have already been recognized, and, depending on the size of B, these gains make the fraudulently-generated gain g immaterial to outside observers, investors, investigators, and auditors. Once the money has hit B2's books (and by extension B2's bank account(s)), the individual(s) involved in B now can extract the fraudulently-generated money. In order to accomplish this relatively simple task, the individual(s) involved in the scheme need only write checks from B2s bank account to themselves and/or others involved in perpetrating said scheme. The precondition in this instance would be that authorization has already been granted to the individual(s) involved in writing the check(s). Furthermore, if T wants to write a check to himself/herself, or another person, he/she need only substantiate said expense/distribution/etc., to the extent that B2 can provide economic substance and reasonable justification for the transaction(s). Economic substance and reasonable justification can again be "proven" by means of internal accounting manipulation. In this case, G points out that if T wants to further shield himself/herself from the scheme, it would be trivial to justify a fake, more granular accounts receivable/payable from/to an individual such as himself/herself, and indeed, enable such fake transactions by means of manipulation of the same deferred tax asset/liability account(s) as in the case of B above.

Crucial is the fact that in the fraud scheme F3 generated by G, no one outside the perpetrators knows about any of the key actions that appear in the plan that is the fraud scheme, unless they have been recruited and are colluding. Collusion by a CFO/Treasurer with members of internal finance/budgeting/audit departments is nothing new, and can quite easily be maintained over time. However, intentionally misstating documents in a way that shields part(s) of a legitimately reduced tax liability, in order to enable an additional cost savings hidden through misstated internal, and in some cases, by extension, external financial statements, to our knowledge is unprecedented on a large scale. This type of fraud, in addition to being novel, is not so easily detected. While executives must provide documented assurance as to the accuracy and reliability of externally audited financial statements (under GAAP), the requirements for dictating the relationship between an officer of a corporation and its shareholders are not as strict. And furthermore, since internal tax is the last department to execute deliverables after the end of a calendar/fiscal year (i.e., after payroll, audit, etc., have completed their processes), the final financial output is in the hands of the individual(s) controlling tax.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts an illustrative computer system 10 that may comprise any type of computing device and, and for example includes at least one processor 12, memory 16, an input/output (I/O) 14 (e.g., one or more I/O interfaces and/or devices), and a communications pathway 17. In general, processor(s) 12 execute program code, such as counter fraud system 20, which is at least partially fixed in memory 16. While executing program code, processor(s) 12 can process data, which can result in reading and/or writing transformed data from/to memory 16 and/or I/O 14 for further processing. Pathway 17 provides a communications link between each of the components in computer system 10. I/O 14 can comprise one or more human I/O devices, which enable a user to interact with computer system 10. To this extent, counter fraud system can manage a set of interfaces (e.g., graphical user interfaces, application program interfaces, etc.) that enable humans and/or other systems to interact with the counter fraud system 20. Further, counter fraud system 20 can manage (e.g., store, retrieve, create, manipulate, organize, present, etc.) data using any solution.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. An artificial intelligence (AI) system for generating novel fraud schemes using AI planning and computational logics operating at a theory-of-mind level, wherein the novel fraud schemes are configured to detect perpetrated fraud, the system comprising:
a memory storing instructions; and
a processor coupled to the memory and configured to execute the instructions to generate a semantic information modeler and a fraud scheme generator, the instructions causing the processor to perform processes including:
implementing, in the semantic information modeler, a mathematical model of a financial or commercial domain which is vulnerable to fraud and which is governed by laws and regulations designed to prevent fraud, wherein the model is based on a set of data sources, wherein the model comprises semantic information, expressed in a formal cognitive event calculus (CEC) language which is highly expressive and in which intensional operators of the CEC are applied to domain participants and allowed to range over subsequent events, wherein the intensional operators relate to what domain participants believe, know, intend, and perceive and comprise theory-of-mind logic involving targeted cognitive states of human agents, and wherein the model is expressed in quantificational formulae so that full models of plans on which fraud schemes are based can be developed, the semantic information including:
rules and processes of the domain expressed as formulae, wherein the rules include at least one of a law or regulation,
semantic models of known fraud schemes pertaining to the domain, and
knowledge bases of domain participants, wherein the domain participants comprise actors capable of perpetrating fraud and observers trained to prevent fraud, wherein the knowledge bases are expressed as theory-of-mind logic and are represented using cognitive calculi that express cognitive states of the domain participants; and
automatically, in the fraud scheme generator, generating a fraud scheme expressed using cognitive calculi within the domain using the semantic information that is carried out by a domain participant, wherein the fraud scheme is configured to create an illicit monetary gain, and wherein generating the fraud scheme includes:
receiving and expressing an inputted goal for the domain as a goal state $S_g$ using cognitive calculi;
providing a start state $S_s$ of the domain expressed using cognitive calculi;
discovering a chain of actions that change the domain from the start state $S_s$ to the goal state $S_g$, wherein each action in the chain of actions is selected from a set of actions that formulaically map a current state of the domain to a new state, wherein the chain of actions comprises a series of events that are related temporally or causally; and
ensuring that the chain of actions forms a novel fraud scheme that breaks at least one law or regulation of the domain and is mathematically provable to be outside the purview of relevant domain participants, and is not a known fraud scheme, wherein proving comprises logically evaluating a plan as a proof and testing and ensuring the plan achieves the goal state;
in response to the generated fraud scheme not being a novel fraud scheme, iteratively generating a new fraud scheme with a new start state and a new goal; and
in response to the generated fraud scheme being a novel fraud scheme, outputting the novel fraud scheme in natural language, and testing the novel fraud scheme in a real environment of the domain to determine if the novel fraud scheme has been perpetrated.

2. The system of claim 1, wherein the observers comprise at least one of reviewers, investigators and auditors.

3. The system of claim 1, further comprising a fraud detection system that applies the novel fraud scheme to real world data to identify potential fraudulent activity.

4. The system of claim 1, further comprising a natural language generator that converts fraud schemes expressed in cognitive event calculus (CEC) formulae into a natural language output.

5. The system of claim 1, wherein the chain of actions expressed as formulae includes a series of temporally and causally related events.

6. The system of claim 1, wherein generating the fraud scheme further includes:
determining whether at least one relevant domain participant could detect the fraud scheme; and
reformulating the chain of action to include actions to recruit the at least one relevant domain participant.

7. The system of claim 1, wherein the fraud is selected from a group consisting of: a medical treatment fraud, a drug diversion fraud, a financial fraud, a game playing fraud, and a business fraud.

8. The system of claim 1, wherein the cognitive calculi utilize:
multi-sorted logics that partition and sort the domain into sub-categories to model elements in the domain and temporal events;
intensional operators that augment the multi-sorted logics to enable modeling of cognitive elements of a participant; and
quantificational formulae expressed in the cognitive calculi over which the intensional operators can range to allow for development of the fraud scheme.

9. A computer program product stored on a non-transitory computer readable medium, which when executed by a computing system utilizes artificial intelligence (AI) to generate novel fraud schemes that are configured to detect perpetrated fraud using AI planning and computational logics operating at a theory-of-mind level, the program product comprising:
program code configured to generate a semantic information modeler and a fraud scheme generator, the program code causing a processor to perform processes including:
implementing, in the semantic information modeler, a mathematical model of a financial or commercial domain which is vulnerable to fraud, wherein the domain is governed by laws and regulations designed to prevent fraud, wherein the model is based on a set of data sources, wherein the model comprises semantic information, expressed in a formal cognitive event calculus (CEC) language which is highly expressive and in which intensional operators of the CEC are applied to domain participants and allowed to range over subsequent events, wherein the intensional operators relate to what domain participants believe, know, intend, and perceive and comprise theory-of-mind logic involving targeted cognitive states of human agents, and wherein the model is expressed in quantificational formulae so that full models of plans on which fraud schemes are based can be developed, the semantic information including:
rules and processes of the domain expressed as formulae, wherein the rules include at least one of a law or regulation,
semantic models of known fraud schemes pertaining to the domain, and
knowledge bases of domain participants, wherein the domain participants comprise actors capable of perpetrating fraud and observers trained to prevent fraud, wherein the knowledge bases are expressed as theory-of-mind logic and are represented using cognitive calculi that express cognitive states of the domain participants; and
automatically, in the fraud scheme generator, generating a fraud scheme expressed using cognitive calculi within the domain using the semantic information that is carried out by a domain participant, wherein the fraud scheme is configured to create an illicit monetary gain, and wherein generating the fraud scheme includes:
receiving and expressing an inputted goal for the domain as a goal state Sg using cognitive calculi;
providing a start state Ss of the domain expressed using cognitive calculi;
discovering a chain of actions that change the domain from the start state Ss to the goal state Sg, wherein each action in the chain of actions is selected from a set of actions that formulaically map a current state of the domain to a new state, wherein the chain of actions comprises a series of events that are related temporally or causally;
ensuring that the chain of actions forms a novel fraud scheme that is mathematically provable to break at least one law or regulation of the domain, to be outside the purview of relevant domain participants and not be a known fraud scheme, wherein proving includes logically evaluating a plan as a proof and testing and ensuring the plan achieves the goal state;
in response to the generated fraud scheme not being a novel fraud scheme, iteratively generating a new fraud scheme with a new start state and a new goal; and
in response to the generated fraud scheme being a novel fraud scheme, outputting the novel fraud scheme in a natural language output that allows the novel fraud scheme to be tested in a real environment of the domain to determine if the novel fraud scheme has been perpetrated.

10. The program product of claim 9, wherein the observers comprise at least one of reviewers, investigators and auditors.

11. The program product of claim 9, further comprising program code that applies novel fraud schemes to real world data to identify potential fraudulent activity.

12. The program product of claim 11, further comprising a natural language generator that converts novel fraud schemes expressed in cognitive event calculus (CEC) formulae into natural language output.

13. The program product of claim 9, wherein the chain of actions expressed as formulae includes a series of temporally or causally related events.

14. The program product of claim 9, wherein the fraud is selected from a group consisting of: a medical treatment fraud, a drug diversion fraud, a financial fraud, a game playing fraud, and a business fraud.

15. The program product of claim 9, wherein the cognitive calculi utilize:
multi-sorted logics that partition and sort the domain into sub-categories to model elements in the domain and temporal events;
intensional operators that augment the multi-sorted logics to enable modeling of cognitive elements of a participant; and
quantificational formulae expressed in the cognitive calculi over which the intensional operators can range to allow for development of the fraud scheme.

16. A computerized method that utilizes artificial intelligence (AI) to generate novel fraud schemes that are configured to detect perpetrated fraud using AI planning and computational logics operating at a theory-of-mind level, the method comprising:
- implementing, in a semantic information modeler, a mathematical model of a financial or commercial domain which is vulnerable to fraud, wherein the domain is governed by laws and regulations designed to prevent fraud, wherein the model is based on a set of data sources, wherein the model comprises semantic information, expressed in a formal cognitive event calculus (CEC) language which is highly expressive and in which intensional operators of the CEC are applied to domain participants and allowed to range over subsequent events, wherein the intensional operators relate to what domain participants believe, know, intend, and perceive and comprise theory-of-mind logic involving targeted cognitive states of human agents, and wherein the model is expressed in quantificational formulae so that full models of plans on which fraud schemes are based can be developed, the semantic information including:
  - rules and processes of the domain expressed as formulae, wherein the rules include at least one of a law or regulation,
  - semantic models of known fraud schemes pertaining to the domain, and
  - knowledge bases of domain participants, wherein the domain participants comprise actors capable of perpetrating fraud and observers trained to prevent fraud, wherein the knowledge bases are expressed as theory-of-mind logic and are represented using cognitive calculi that express cognitive states of the domain participants; and
- automatically, in a fraud scheme generator, generating a fraud scheme expressed using cognitive calculi within the domain using the semantic information that is carried out by a domain participant, wherein the fraud scheme is configured to create an illicit monetary gain, wherein generating the fraud scheme includes:
  - receiving and expressing an inputted goal for the domain as a goal state Sg using cognitive calculi;
  - providing a start state Ss of the domain expressed using cognitive calculi;
  - discovering a chain of actions that change the domain from the start state Ss to the goal state Sg, wherein each action in the chain of actions is selected from a set of actions that formulaically map a current state of the domain to a new state, wherein the chain of actions comprises a series of events that are related temporally or causally; and
  - ensuring that the chain of actions forms a novel fraud scheme that is mathematically provable to break at least one law or regulation of the domain, to be outside the purview of relevant domain participants and not be a known fraud scheme, wherein proving includes logically evaluating a plan as a proof and testing and ensuring the plan achieves the goal state;
  - in response to the generated fraud scheme not being a novel fraud scheme, iteratively generating a new fraud scheme with a new start state and a new goal;
  - in response to the generated fraud scheme being a novel fraud scheme, outputting the novel fraud scheme in natural language that allows the novel fraud scheme to be tested in a real environment of the domain to determine if the novel fraud scheme has been perpetrated.

17. The method of claim 16, further comprising applying novel fraud schemes to real world data to identify potential fraudulent activity.

* * * * *